United States Patent
Hamada et al.

(10) Patent No.: US 10,934,927 B2
(45) Date of Patent: Mar. 2, 2021

(54) PRE-CHAMBER TYPE INTERNAL COMBUSTION ENGINE

(71) Applicant: TOYOTA JIDOSHA KABUSHIKI KAISHA, Toyota (JP)

(72) Inventors: Shohei Hamada, Susono (JP); Akira Kato, Sunto-gun (JP); Noriyuki Takada, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/585,125

(22) Filed: Sep. 27, 2019

(65) Prior Publication Data

US 2020/0165961 A1 May 28, 2020

(30) Foreign Application Priority Data

Nov. 26, 2018 (JP) .............................. JP2018-220255

(51) Int. Cl.
*F02B 19/12* (2006.01)
*F02P 13/00* (2006.01)
(Continued)

(52) U.S. Cl.
CPC ............ *F02B 19/12* (2013.01); *F02B 19/108* (2013.01); *F02B 19/18* (2013.01); *F02F 1/242* (2013.01); *F02P 13/00* (2013.01); *F02M 57/06* (2013.01)

(58) Field of Classification Search
CPC ...... F02B 19/10; F02B 19/1023; F02B 19/12; F02B 19/16; F02B 19/18; F02M 57/06; F02P 13/00; F02F 1/24; F02F 1/242
(Continued)

(56) References Cited

U.S. PATENT DOCUMENTS 2,758,576 A * 8/1956 Schlamann ......... F02B 19/1085
123/27 R
8,839,762 B1 * 9/2014 Chiera .................. F02B 19/108
123/256
(Continued)

FOREIGN PATENT DOCUMENTS

JP 08-284665 A 10/1996
JP 2009-215973 A 9/2009
(Continued)

*Primary Examiner* — John Kwon
*Assistant Examiner* — Johnny H Hoang
(74) *Attorney, Agent, or Firm* — Oblon, McClelland, Maier & Neustadt, L.L.P.

(57) ABSTRACT

A pre-chamber is formed between the front end of a spark plug attached to the cylinder head and a thin pre-chamber wall sticking out from the inside wall surface of the cylinder head to the inside of a main combustion chamber. The communication holes communicating the inside of the pre-chamber and the inside of the main combustion chamber are formed inside the thin pre-chamber wall. The thin pre-chamber wall is formed into a shape with a cross-sectional area gradually decreasing from the inside wall surface of the cylinder head toward the inside of the main combustion chamber such as a conical shape, frustoconical shape, polygonal conical shape, or polygonal frustoconical shape. A ground side electrode portion of the spark plug is positioned inside the gas pocket, and a discharge is caused between the center electrode sticking out from the front end of the center electrode insulator and the ground side electrode portion at the time of ignition.

2 Claims, 4 Drawing Sheets

(51) Int. Cl.
  *F02B 19/10*   (2006.01)
  *F02F 1/24*    (2006.01)
  *F02B 19/18*   (2006.01)
  *F02M 57/06*   (2006.01)

(58) Field of Classification Search
  USPC .............................. 123/259, 260, 266, 273
  See application file for complete search history.

(56) References Cited

U.S. PATENT DOCUMENTS

| | | | |
|---|---|---|---|
| 9,004,042 B2* | 4/2015 | Tozzi ..................... | F02B 19/12 |
| | | | 123/260 |
| 2009/0309475 A1* | 12/2009 | Tozzi ..................... | F02B 19/12 |
| | | | 313/143 |
| 2012/0125287 A1* | 5/2012 | Chiera ................... | F02B 19/16 |
| | | | 123/254 |
| 2013/0206122 A1* | 8/2013 | Chiera ................. | F02P 15/001 |
| | | | 123/594 |
| 2014/0261298 A1* | 9/2014 | Sasidharan ......... | F02B 19/1019 |
| | | | 123/275 |

FOREIGN PATENT DOCUMENTS

| JP | 2016-035854 A | 3/2016 |
|---|---|---|
| JP | 2017-137820 A | 8/2017 |

\* cited by examiner

PRE-CHAMBER TYPE INTERNAL COMBUSTION ENGINE

FIELD

The present invention relates to a pre-chamber type internal combustion engine.

BACKGROUND

Known in the art is a pre-chamber type internal combustion engine in which a main combustion chamber is formed between the inside wall surface of a cylinder head and the top surface of a piston, a pre-chamber is formed between the front end of a spark plug attached to the cylinder head and a semispherical shaped thin pre-chamber wall sticking out from the inside wall surface of the cylinder head to the inside of the main combustion chamber, communication holes communicating the inside of the pre-chamber and the inside of the main combustion chamber are formed inside the semispherical shaped thin pre-chamber wall, the spark plug is arranged in the pre-chamber, and, when the spark plug is used to make the air-fuel mixture in the pre-chamber burn, jet flames are ejected from the communication holes to the main combustion chamber (see for example Japanese Unexamined Patent Publication No. 2016-35854).

SUMMARY

Technical Problem

However, if, as in this pre-chamber type internal combustion engine, the thin pre-chamber wall is formed into a semispherical shape, the surface area of the thin pre-chamber wall facing the main combustion chamber is large, so the heat of combustion inside the main combustion chamber used for raising the temperature of the thin pre-chamber wall and the heat of combustion inside the main combustion chamber escaping through the thin pre-chamber wall to the cylinder head are increased. As a result, there is the problem that the cooling loss increases and a high heat efficiency cannot be obtained.

To solve the above problem, according to the present invention, there is provided a pre-chamber type internal combustion engine comprising;
   a main combustion chamber formed between an inside wall surface of a cylinder head and a top surface of a piston,
   a spark plug attached to the cylinder head, and
   a pre-chamber formed between a front end of the spark plug and a thin pre-chamber wall sticking out from the inside wall surface of the cylinder head to an inside of the main combustion chamber,
   the thin pre-chamber wall having communication holes formed therein and communicating an inside of the pre-chamber and an inside of the main combustion chamber,
   the front end of the spark plug having a hollow cylinder shaped outer tube, a columnar shaped center electrode insulator which extends inside the outer tube along a center axis of the outer tube, and a ring shaped gas pocket which is formed between the outer tube and the center electrode insulator and communicates with the inside of the pre-chamber,
   jet flames being ejected from the communication holes to the main combustion chamber when an air-fuel mixture in the pre-chamber is burned by the spark plug, wherein the thin pre-chamber wall is formed into one of a conical shape, frustoconical shape, polygonal conical shape, and polygonal frustoconical shape with a cross-sectional area gradually decreasing from the inside wall surface of the cylinder head toward the inside of the main combustion chamber, a ground side electrode portion of the spark plug is positioned inside the gas pocket, and a discharge is caused between a center electrode sticking out from a front end of the center electrode insulator and the ground side electrode portion at the time of ignition.

Advantageous Effects of Invention

By making the shape of the thin pre-chamber wall a conical shape, frustoconical shape, polygonal conical shape, or polygonal frustoconical shape, the surface area of the thin pre-chamber wall facing the main combustion chamber becomes smaller and therefore the cooling loss can be reduced. Further, if making the surface area of the thin pre-chamber wall facing the main combustion chamber smaller, the temperature of the gas inside the pre-chamber will not become higher, so particularly at the time of cold operation, the ignition of the air-fuel mixture in the pre-chamber by the spark plug will become unstable, but it is possible to secure stable ignition by making the air-fuel mixture in the gas pocket with the particularly high temperature in the pre-chamber ignite.

BRIEF DESCRIPTION OF DRAWINGS

FIG. 3A is a bottom view of the thin pre-chamber wall shown in FIG. 2, while

FIG. 6A is an enlarged side cross-sectional view of the surroundings of a pre-chamber showing still further embodiment, while

DESCRIPTION OF EMBODIMENTS

Figure 1:
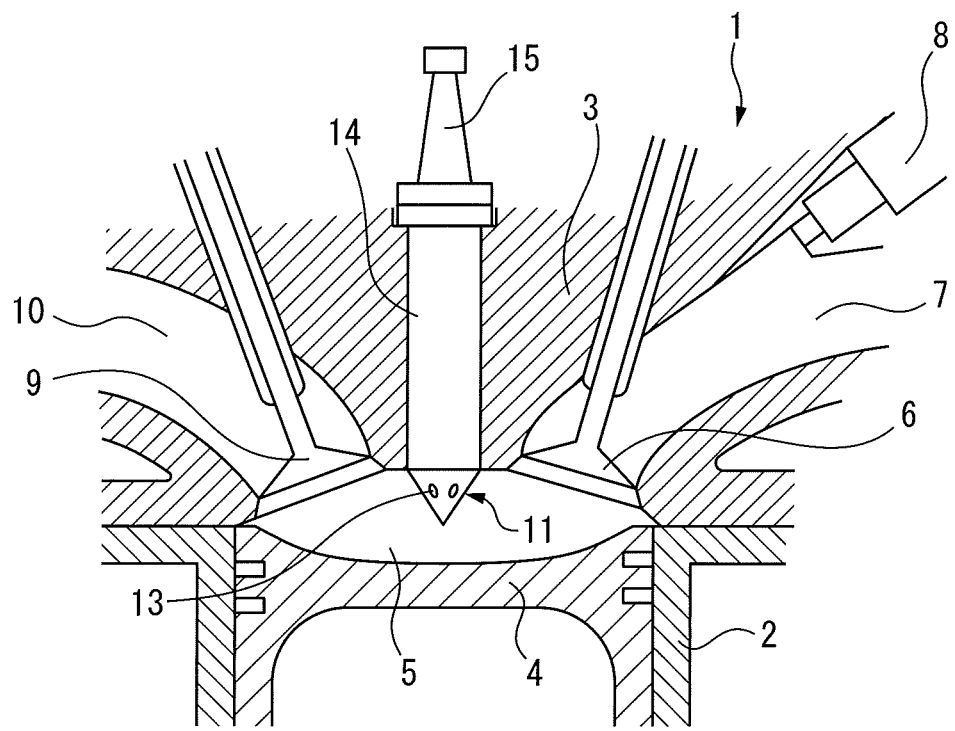
FIG. 1 is a side view of a pre-chamber type internal combustion engine.

FIG. 1 shows an overall view of a pre-chamber type internal combustion engine using gasoline as fuel. If referring to FIG. 1, 1 indicates an engine body, 2 a cylinder block, 3 a cylinder head attached on the cylinder block 2, 4 a piston reciprocating inside the cylinder block 2, 5 a main combustion chamber formed between the inside wall surface of the cylinder head 3 and the top surface of the piston 4, 6 an intake valve, 7 an intake port, 8 a fuel injector arranged inside the intake port 7, 9 an exhaust valve, and 10 an exhaust port.

Figure 2:
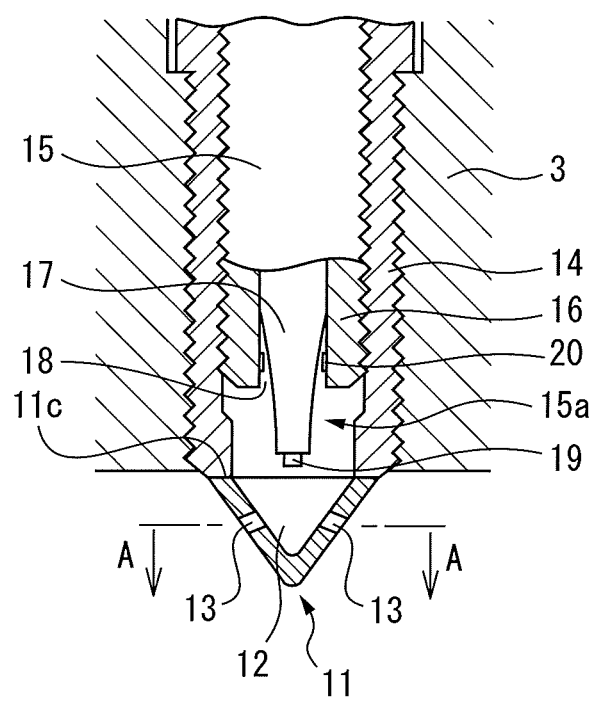
FIG. 2 is an enlarged side cross-sectional view of the surroundings of a pre-chamber.
Figure 3A:
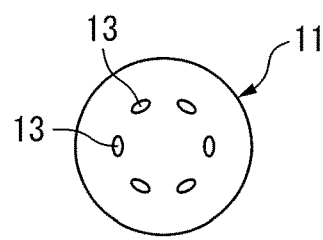
Figure 3B:
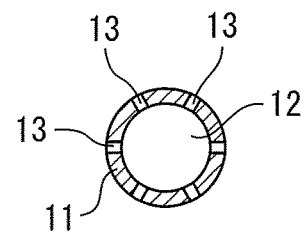
FIG. 3B is a cross-sectional view seen along the A-A section of FIG. 2.

As shown in FIG. 1 and FIG. 2, the cylinder head 3 is formed with a pre-chamber 12 surrounded by a thin pre-chamber wall 11 sticking out from the inside wall surface of the cylinder head 3 to the inside of the main combustion chamber 5. In the embodiment shown in FIG. 1 and FIG. 2, this thin pre-chamber wall 11 is formed into a conical shape with a horizontal cross-sectional area gradually decreasing from the inside wall surface of the cylinder head 3 toward the inside of the main combustion chamber 5. Inside the thin pre-chamber wall 11, a plurality of communication holes 13 are formed communicating the inside of the pre-chamber 12 and the inside of the main combustion chamber 5. In the embodiment shown in FIG. 1 and FIG. 2, as shown in FIG. 3B, these communication holes 13 extend radially from the inside of the pre-chamber 12 toward the inside of the main combustion chamber 5.

Figure 4:
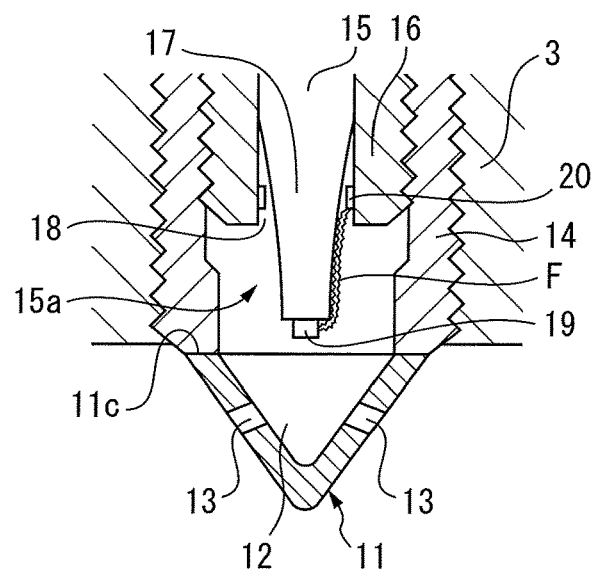
FIG. 4 is a side cross-sectional view further enlarging the surroundings of the pre-chamber of FIG. 2.

As shown in FIG. 2, inside the cylinder head 3, a metal hollow sleeve 14 is screwed. Inside this hollow sleeve 14, the body of the spark plug 15 is attached. Referring to FIG. 2 and FIG. 4, the front end 15a of the spark plug 15 is provided with a hollow cylindrical shaped metal outer tube 16 and a columnar center electrode insulator 17 extending inside the outer tube 16 along the center axis of the outer tube 16. The outer tube 16 is screwed into the hollow sleeve 14. The pre-chamber 12 is formed between the front end 15a of this spark plug 15 and the thin pre-chamber wall 11. Between the outer tube 16 and the center electrode insulator 17, a ring-shaped gas pocket 18 is formed. This gas pocket 18 is communicated with the pre-chamber 12. Note that, in this embodiment, the ring-shaped end face 11c of the thin pre-chamber wall 11 is connected to the front end face of the hollow sleeve 14 by welding.

As shown in FIG. 2 and FIG. 4, a center electrode 19 sticks out from the front end of the center electrode insulator 17. Inside the gas pocket 18, a ground side electrode portion 20 is provided. In the embodiment shown in FIG. 2 and FIG. 4, this ground side electrode portion 20 is comprised of a ground side electrode formed inside the gas pocket 18 at the inner circumferential surface of the outer tube 16. At the time of igniting the air-fuel mixture in the pre-chamber 12, as shown in FIG. 4 by F, discharge is performed between the center electrode 19 sticking out from the front end of the center electrode insulator 17 and the ground side electrode 20.

In the pre-chamber type internal combustion engine shown in FIG. 1, when the intake valve 6 opens, the fuel injected from the fuel injector 8 is supplied together with the intake air to the inside of the main combustion chamber 5. Due to this, an air-fuel mixture is formed inside the main combustion chamber 5. Next, when the compression stroke is started, the air-fuel mixture inside the main combustion chamber 5 flows in from the communication holes 13 to the pre-chamber 12. Next, when reaching the end period of the compression stroke, the spark plug 15 ignites the air-fuel mixture in the pre-chamber 12, whereby jet flames are ejected from the communication holes 13 of the pre-chamber 12 toward the inside of the main combustion chamber 5. The air-fuel mixture inside the main combustion chamber 5 is made to rapidly burn by these jet flames.

Now then, if combustion occurs in the main combustion chamber 5, a part of the heat of combustion inside the main combustion chamber 5 is used on the one hand for raising the temperature of the thin pre-chamber wall 11 and on the other hand escapes through the thin pre-chamber wall 11 to the cylinder head 3. As a result, cooling loss occurs. In this case, the larger the surface area of the thin pre-chamber wall 11 facing the main combustion chamber 5, the more the heat of combustion used for raising the temperature of the thin pre-chamber wall 11 and the heat of combustion escaping through the thin pre-chamber wall 11 to the cylinder head 3 increase and as a result the more the cooling loss increases. However, in the embodiment shown in FIG. 1 to FIG. 4, the thin pre-chamber wall 11 is formed into a conical shape with a small surface area facing the main combustion chamber 5. Therefore, the heat of combustion used for raising the temperature of the thin pre-chamber wall 11 and the heat of combustion escaping through the thin pre-chamber wall 11 to the cylinder head 3 are reduced and thereby the cooling loss is made to decrease.

On the other hand, if the surface area of the thin pre-chamber wall 11 facing the main combustion chamber 5 is made smaller, as explained above, the heat of combustion used for raising the temperature of the thin pre-chamber wall 11 is reduced, so the temperature of the thin pre-chamber wall 11 falls. If the temperature of the thin pre-chamber wall 11 falls, a rise in temperature of the air-fuel mixture flowing from the communication holes 13 to the inside of the pre-chamber 12 is suppressed. Therefore, in particular, at the time of a cold engine, the temperature of the air-fuel mixture in the pre-chamber 12 does not become sufficiently high. As a result, the ignition of the air-fuel mixture by the spark plug 15 becomes unstable. In this regard, however, even when the engine is cold, high temperature gas remains inside the gas pocket 18 of the spark plug 15, and a part of the air-fuel mixture flowing in from the communication holes 13 to the pre-chamber 12 flows into the gas pocket 18, so the air-fuel mixture inside the gas pocket 18 becomes high in temperature.

Therefore, as shown in FIG. 4 by F, if discharge is performed between the center electrode 19 sticking out from the front end of the center electrode insulator 17 and the ground side electrode 20, the temperature of the air-fuel mixture in the surroundings is sufficiently high, so the air-fuel mixture is easily ignited. As a result, even at the time of a cold engine, stable ignition of the air-fuel mixture can be secured.

Figure 8A:
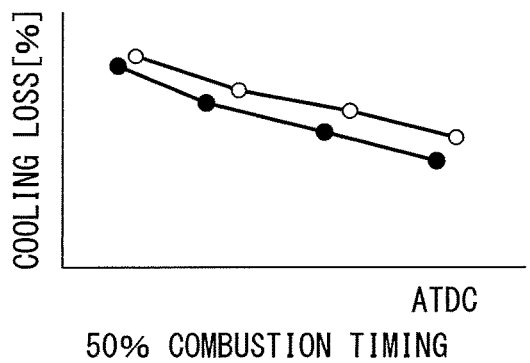
FIG. 8A, FIG. 8B, and FIG. 8C are views showing various test results.
Figure 8B:
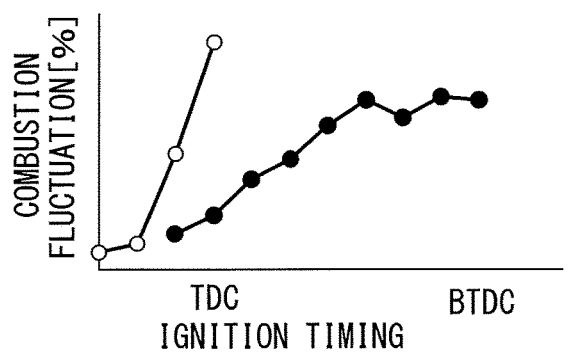
Figure 8C:
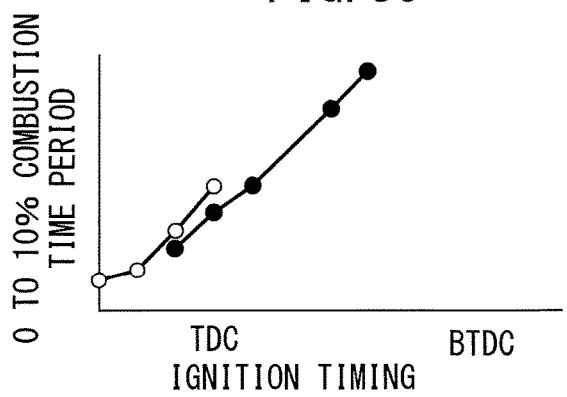

FIG. 8A, FIG. 8B, and FIG. 8C show the test results. The ordinate of FIG. 8A shows the cooling loss found based on the change in pressure in the main combustion chamber 5, while the abscissa shows the crank angle after top dead center (ATDC) at the time of 50% combustion. Note that, in FIG. 8A, the 0 marks indicate the case of use of a conventional semispherical shaped thin pre-chamber wall, while the ● marks indicate the case of use of a thin pre-chamber wall according to the present invention shown in FIG. 2 and FIG. 4. From FIG. 8A, it will be learned that when using the thin pre-chamber wall according to the present invention, compared with the case of use of a conventional thin pre-chamber wall, the cooling loss falls.

The ordinate of FIG. 8C shows the crank angle up to 10% combustion, that is, the initial combustion time period, while the abscissa shows the ignition timing expressed by the crank angle before top dead center (BTDC). On the other hand, the ordinate of FIG. 8B shows the fluctuation in combustion, while the abscissa shows the ignition timing expressed by the crank angle before top dead center (BTDC). Note that, in FIG. 8B and FIG. 8C, the 0 marks indicate the case of use of a conventional spark plug where the ground side electrode is arranged facing the center electrode, while the ● marks indicate the case of use of the spark plug according to the present invention shown in FIG. 2 and FIG. 4. From FIG. 8C and FIG. 8B, it will be learned that when using the spark plug according to the present invention, compared with the case of use of a conventional spark plug, the initial combustion time period becomes shorter and the fluctuation in combustion falls.

Figure 5:
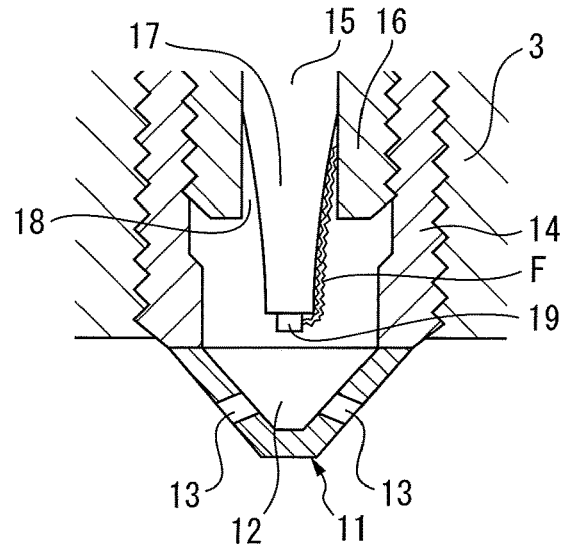
FIG. 5 is an enlarged side cross-sectional view of the surroundings of a pre-chamber showing another embodiment.

FIG. 5 shows another embodiment according to the present invention. In this embodiment, the thin pre-chamber wall 11 is formed into a frustoconical shape. Furthermore, in this embodiment, a ground side electrode 20 such as shown in FIG. 4 is not formed on the inner circumferential surface of the outer tube 16. In this way, even if a ground side electrode 20 such as shown in FIG. 4 is not formed on the inner circumferential surface of the outer tube 16, if an ignition voltage is applied between the center electrode 19 and the outer tube 16, as shown by F in FIG. 4, a discharge current flows along the outer circumferential surface of the center electrode insulator 17, that is, creeping discharge occurs, between the center electrode 19 and the inner circumferential surface of the outer tube 16 at the deepest part of the gas pocket 18. Due to this creeping discharge, the air-fuel mixture in the gas pocket 18 ignites. In this case, the inner circumferential surface of the outer tube 16 at the deepest part of the gas pocket 18 forms the ground side electrode portion.

Figure 6A:
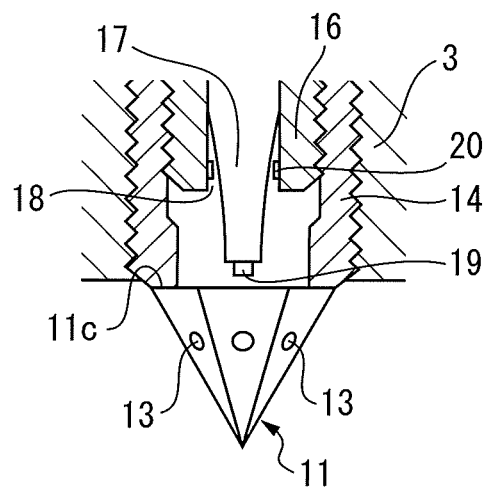
Figure 6B:
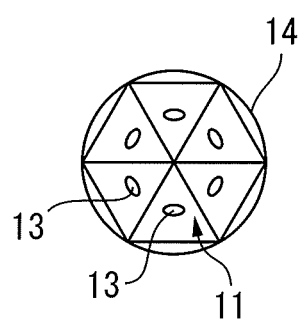
FIG. 6B is a bottom view of the thin pre-chamber wall shown in FIG. 6A.

FIG. 6A and FIG. 6B show still another embodiment according to the present invention. In this embodiment, the thin pre-chamber wall 11 is formed into a polygonal conical shape. Even if in this way forming the thin pre-chamber wall 11 into a polygonal conical shape, the surface area of the thin pre-chamber wall 11 facing the main combustion chamber 5 becomes smaller. Therefore, the heat of combustion inside the main combustion chamber 5 used for raising the temperature of the thin pre-chamber wall 11 and the heat of combustion inside the main combustion chamber 5 escaping through the thin pre-chamber wall 11 to the cylinder head 3 are reduced. Due to this, the cooling loss can be reduced. Note that, in this case, the thin pre-chamber wall 11 can be formed into a polygonal conical shape similar to the shape shown in FIG. 5.

Figure 7:
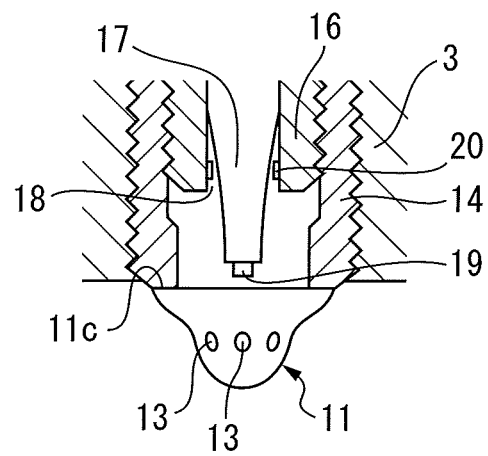
FIG. 7 is an enlarged side cross-sectional view of the surroundings of a pre-chamber showing still further embodiment.

FIG. 7 shows still another embodiment according to the present invention. In this embodiment, the thin pre-chamber wall 11 is formed into a shape close to a frustoconical shape. The thin pre-chamber wall 11 of the shape close to a frustoconical shape such as shown in FIG. 7 also is included in the thin pre-chamber wall 11 of a frustoconical shape which is referred to in the present invention.

In this way, according to the present invention, the main combustion chamber 5 is formed between the inside wall surface of the cylinder head 3 and the top surface of the piston 4, while the pre-chamber 12 is formed between the front end 15a of the spark plug 15 attached to the cylinder head 3 and the thin pre-chamber wall 11 sticking out from the inside wall surface of the cylinder head 3 to the inside of the main combustion chamber 5. The communication holes 13 communicating the inside of the pre-chamber 12 and the inside of the main combustion chamber 5 are formed inside the thin pre-chamber wall 11, while the front end 15a of the spark plug 15 is provided with the hollow cylinder shaped outer tube 16, the columnar shaped center electrode insulator 17 extending inside the outer tube 16 along the center axis of the outer tube 16, and the ring shaped gas pocket 18 formed between the outer tube 16 and the center electrode insulator 17 and communicating with the inside of the sub chamber 12. When the spark plug 15 is used to make the air-fuel mixture in the pre-chamber 12 burn, jet flames are ejected from the communication holes 13 to the main combustion chamber 5. The thin pre-chamber wall 11 is formed into a conical shape, frustoconical shape, polygonal conical shape, or polygonal frustoconical shape with a horizontal cross-sectional area gradually decreasing from the inside wall surface of the cylinder head 3 toward the inside of the main combustion chamber 5. The ground side electrode portion of the spark plug 15 is positioned inside the gas pocket 18, and a discharge is caused between the center electrode 19 sticking out from the front end of the center electrode insulator 17 and the ground side electrode portion at the time of ignition.

In this way, by making the shape of the thin pre-chamber wall 11 a conical shape, frustoconical shape, polygonal conical shape, or polygonal frustoconical shape and using the spark plug to make the air-fuel mixture in the gas pocket ignite, it is possible to reduce the cooling loss while securing stable ignition.

The invention claimed is:

1. A pre-chamber type internal combustion engine comprising;
 a main combustion chamber formed between an inside wall surface of a cylinder head and a top surface of a piston,
 a spark plug attached to the cylinder head, and
 a pre-chamber formed between a front end of the spark plug and a thin pre-chamber wall sticking out from the inside wall surface of the cylinder head to an inside of the main combustion chamber,
 said thin pre-chamber wall having communication holes formed therein and communicating an inside of the pre-chamber and an inside of the main combustion chamber,
 said front end of the spark plug having a hollow cylinder shaped outer tube, a columnar shaped center electrode insulator which extends inside the outer tube along a center axis of the outer tube from an inside wall surface of the outer tube, while leaving from the inside wall surface of the outer tube, towards the pre-chamber beyond a tip end of the outer tube, and a ring shaped gas pocket which is formed between the inside wall surface of the outer tube and the center electrode insulator and communicates with the inside of the pre-chamber,
 jet flames being ejected from the communication holes to the main combustion chamber when an air-fuel mixture in the pre-chamber is burned by the spark plug, wherein
 the thin pre-chamber wall is formed into one of a conical shape, frustoconical shape, polygonal conical shape, and polygonal frustoconical shape with a cross-sectional area gradually decreasing from the inside wall surface of the cylinder head toward the inside of the main combustion chamber, a ground side electrode portion of the spark plug is formed on the inside wall surface of the outer tube positioned inside the gas pocket, and a discharge is caused between a center electrode sticking out from a front end of the center electrode insulator and the ground side electrode portion at the time of ignition.

2. The pre-chamber type internal combustion engine according to claim 1, further comprising a metal hollow sleeve which is screwed inside the cylinder head,
 wherein the outer tube is screwed into the hollow sleeve, and an end face of the thin pre-chamber wall is connected to a front end face of the hollow sleeve.

\* \* \* \* \*